United States Patent
Liu et al.

(10) Patent No.: US 10,684,208 B2
(45) Date of Patent: Jun. 16, 2020

(54) DEVICE FOR MULTI-PARAMETER INTEGRATED MONITORING OF DEEP SUBMARINE TURBIDITY CURRENT

(71) Applicant: Ocean University of China, Qingdao (CN)

(72) Inventors: Tao Liu, Qingdao (CN); Guanli Wei, Qingdao (CN); Lei Guo, Qingdao (CN); Yan Zhang, Qingdao (CN); Yongmao Zhu, Qingdao (CN); Xiuqing Yang, Qingdao (CN); Zhenqi Guo, Qingdao (CN); Dong Wang, Qingdao (CN)

(73) Assignee: OCEAN UNIVERSITY OF CHINA, Qingdao (CN)

( * ) Notice: Subject to any disclaimer, the term of this patent is extended or adjusted under 35 U.S.C. 154(b) by 0 days.

(21) Appl. No.: 16/502,049

(22) Filed: Jul. 3, 2019

(65) Prior Publication Data
US 2020/0018678 A1 Jan. 16, 2020

(30) Foreign Application Priority Data
Jul. 16, 2018 (CN) .......................... 2018 1 0775898

(51) Int. Cl.
| | |
|---|---|
| *G01N 15/06* | (2006.01) |
| *G01L 11/02* | (2006.01) |
| *G01N 1/10* | (2006.01) |
| *G01P 7/00* | (2006.01) |
| *G01P 13/00* | (2006.01) |

(52) U.S. Cl.
CPC ............ *G01N 15/06* (2013.01); *G01L 11/025* (2013.01); *G01N 1/10* (2013.01); *G01P 7/00* (2013.01); *G01P 13/0013* (2013.01); *G01N 2001/1025* (2013.01); *G01N 2015/0693* (2013.01)

(58) Field of Classification Search
CPC .. G01N 15/06; G01N 1/10; G01N 2001/1025; G01N 2015/0693; G01N 21/5907; G01L 11/025; G01P 7/00; G01P 13/0013
See application file for complete search history.

(56) References Cited

PUBLICATIONS

Huang, An-Bin, et al. "Applications of FBG-based sensors to ground stability monitoring." Journal of Rock Mechanics and Geotechnical Engineering 8.4 (2016): 513-520. (Year: 2016).*

* cited by examiner

*Primary Examiner* — Maurice C Smith
(74) *Attorney, Agent, or Firm* — Bayramoglu Law Offices LLC

(57) ABSTRACT

A device for multi-parameter integrated monitoring of a deep submarine turbidity current primarily includes cement pile pore-pressure monitoring, optical turbidity monitoring, floating ball flow velocity monitoring, and turbidity current sediment sampling, can observe the turbidity, excess pore pressure, flow velocity, and other parameters of the turbidity current, can fulfill simultaneous and real-time transmission for in-situ monitoring, and can complete multiple tasks at the same observing position, so that the situation where the sampling position and the observing position are different due to the movement of an apparatus along with a ship during ordinary work is avoided.

8 Claims, 3 Drawing Sheets

DEVICE FOR MULTI-PARAMETER INTEGRATED MONITORING OF DEEP SUBMARINE TURBIDITY CURRENT

CROSS REFERENCE TO THE RELATED APPLICATIONS

This application is based upon and claims priority to Chinese Patent Application No. 201810775898.8, filed on Jul. 16, 2018, the entire contents of which are incorporated herein by reference.

TECHNICAL FIELD

The invention belongs to the technical field of marine observation, and particularly relates to a deep submarine turbidity current monitoring device and a method for using the same.

BACKGROUND geological observation in deep submarine engineering is a crucial means for the development of marine science of the deep sea and plays an important role in revealing the dynamic response process of recent sediments under the action of deep marine power and in deeply understanding the geological process of marine power.

Compared with another main sediment transport process on the earth, namely the river turbidity current, the submarine turbidity current is still very little known. Due to the fact that the turbidity current is mostly generated in a deep-water area, the cost and risk of site observational study are high; long-term and continuous observation is required due to the unpredictability of the generation of the turbidity current; and observation apparatus are either broken or lost due to the destruction from the turbidity current. Low-velocity and low-concentration small turbidity currents in lakes and submarine canyons can be conveniently observed in situ. However, there are only three cases available for the understanding of large turbidity currents: the Var canyon, the Zaire sediment fan, and the canyon/manila trench in the southwest of Taiwan, China. These scanty data are obtained mainly through analysis on the fracture sequence of communication cables and drilling samples.

Due to the unpredictability of the forming mechanism of the turbidity current, observation and research of the submarine turbidity current are much more difficult than those of the lakebed turbidity current. Site observation of the submarine turbidity current mainly aims at low-velocity turbidity currents and is carried out in submarine canyons in most cases, and the submarine turbidity current is monitored mainly by means of a turbidimeter, an ADCP, and equipment which can only fulfill short-term monitoring on a certain parameter of the turbidity current, but cannot fulfill long-term submarine monitoring. So far, there is no apparatus that can withstand the impact from the turbidity current without being damaged.

The turbidity current is the key to solving many basic science problems of marine geology and sedimentology, and is closely linked with the study of the application of marine resources and energy and to preventing submarine hazards. Due to the unpredictability and destruction of the turbidity current, how to realize real-time and continuous on-site observation of the turbidity current is still a bottleneck restraining the research of the turbidity current.

SUMMARY

The objective of the invention is to provide a device for multi-parameter integrated monitoring of a deep submarine turbidity current, so as to fulfill monitoring and sampling of multiple parameters, such as turbidity, flow velocity, density, and seabed pore pressure, of the deep submarine turbidity current and to provide crucial data and sediment samples for research of the turbidity current.

The invention is fulfilled by adopting the following technical solution:

The device for multi-parameter integrated monitoring of a deep submarine turbidity current includes an upper part and a lower part, wherein:

The lower part includes a cement pile, and a casing pipe is embedded into the cement pile to form a combined-type pore-pressure monitoring probe rod; water-permeable stone rings are clamped in the cement pile in a spaced manner in a vertical direction and have an outer diameter identical to the outer diameter of the cement pile and an inner diameter identical to the outer diameter of the casing pipe; and inner water-permeable stones and FBG pore-pressure sensors are arranged on the inner wall of the casing pipe and are located on the water-permeable stone rings, the sensors have bottoms connected with the inner water-permeable stones and upper parts connected with a top water-permeable stone, seawater from above enters the probe rod through the top water-permeable stone, and the pressure of the seawater from above and the pore pressures of seabed sediments act on the FBG pore-pressure sensors;

The upper part includes a glass cover, and a pile hole is formed in the glass cover and has a bottom in threaded connection with the casing pipe and a top provided with the top water-permeable stone; and a control circuit board and a slide rail are mounted in the glass cover, a scattered light receiving system and an infrared excitation light source capable of emitting an incident light are mounted on the slide rail through mounting bases, the emitting angle and the receiving angle of the light source are adjusted through adjustment of the rotation directions of the mounting bases as well as a relative distance between the two mounting bases on the slide rail, and the intersection of the incident light and a scattered light is a turbidity monitoring area; and Turbidity current sediment samplers are distributed around the glass cover, sampler switches are connected with a Kevlar cable reel, and a three-axis acceleration sensor is arranged in a floating ball mounted at the end of a Kevlar cable.

Furthermore, the water-permeable stone rings are clamped in the cement pile at an interval of 1 m.

Furthermore, the cement pile has a length of 5 m and the outer diameter of 50 cm, and the casing pipe has a length of 5 m and a diameter of 15 cm and is made of a 316L stainless steel.

Furthermore, the scattered light receiving system includes a photoelectric sensor, a light receiving plate, and a light filter which are sequentially mounted.

Furthermore, the casing pipe is the 316L stainless steel pipe.

Furthermore, the Kevlar cable has a length of 30 m.

Compared with the prior art, the invention has the following advantages and beneficial effects:

The turbidity current monitoring device primarily includes cement pile pore-pressure monitoring, optical turbidity monitoring, floating ball flow velocity monitoring, and turbidity current sediment sampling, can fulfill simultaneous and real-time transmission for in-situ monitoring, and can complete multiple tasks at the same observing position, so that the situation where the sampling position and the observing position are different due to the movement of an apparatus along with a ship during ordinary work is avoided.

The device adopting a shell of the cement pile, the high-strength 316L stainless steel pipe, the high-strength glass cover, the samplers, the floating ball, and the Kevlar cable can work for 2-3 years underwater, has a real-time transmission function, can fulfill multi-parameter multi-functional integrated observation of the turbidity, flow velocity, density, pore pressure, and in-situ sampling of a deep-sea specific area, can also fulfill dynamic pore-pressure monitoring of the seabed sediments by adopting the combined-type pore-pressure monitoring probe rod, and can protect the probe rod against impact and destruction from the turbidity current through double protection of the cement pile and a stainless steel rod body, so as to keep the probe rod stable.

Figure 1:
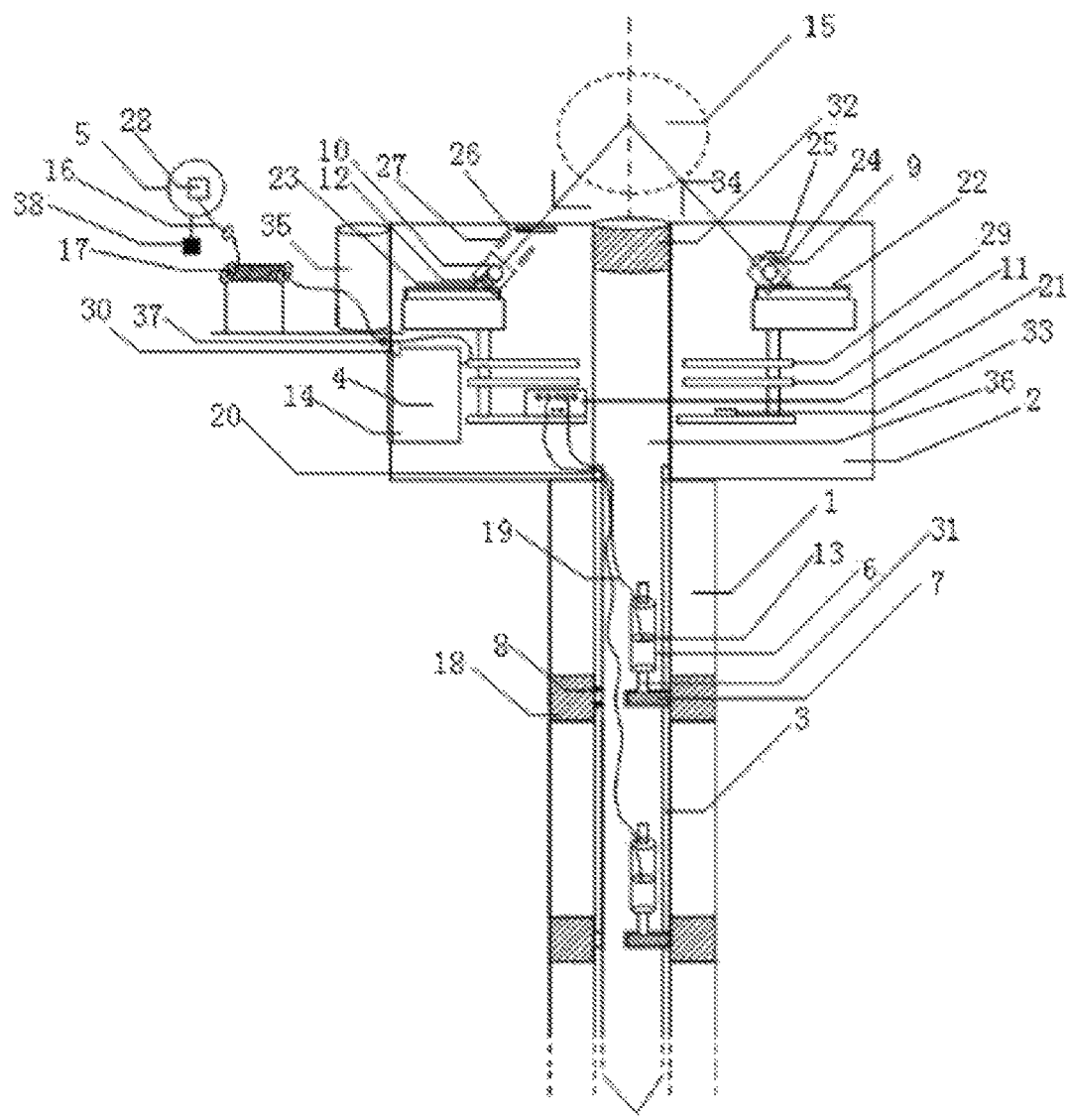
FIG. 1 is an overall structural view of a device for multi-parameter integrated monitoring of a deep submarine turbidity current of the invention.
Figure 2:
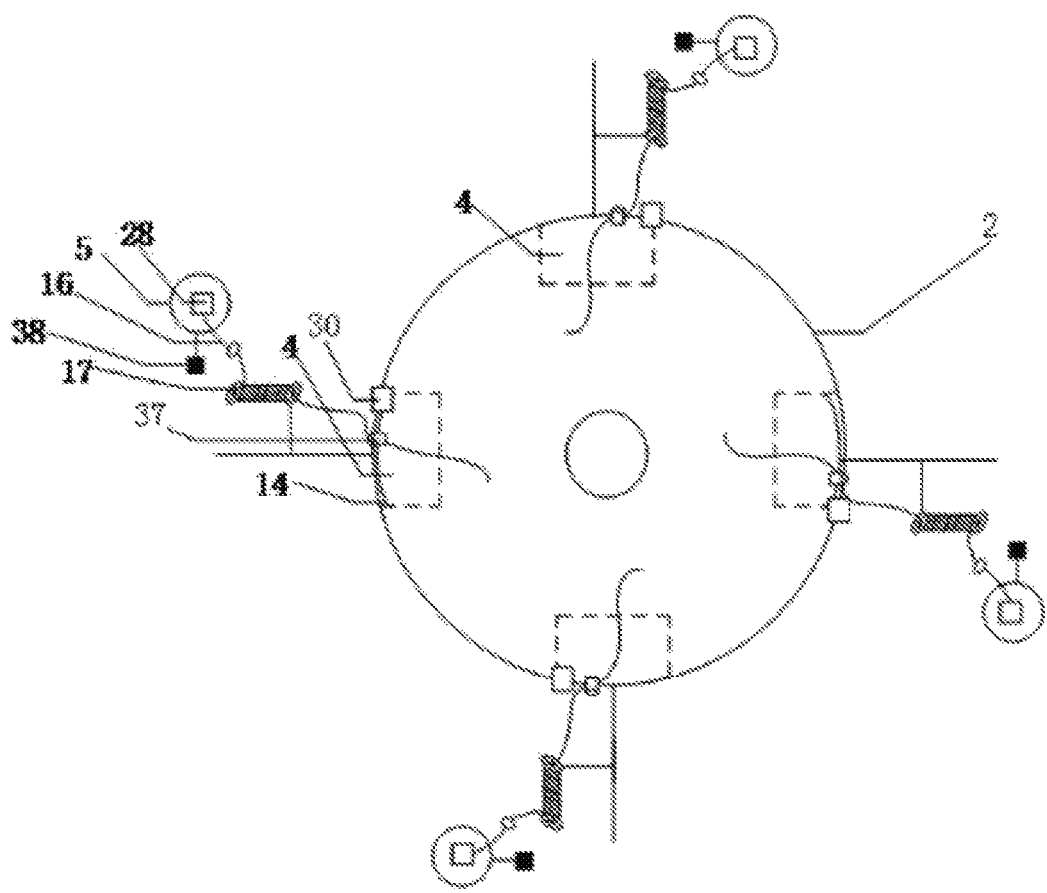
FIG. 2 is a distribution diagram of a floating ball of the device of the invention.
Figure 3:
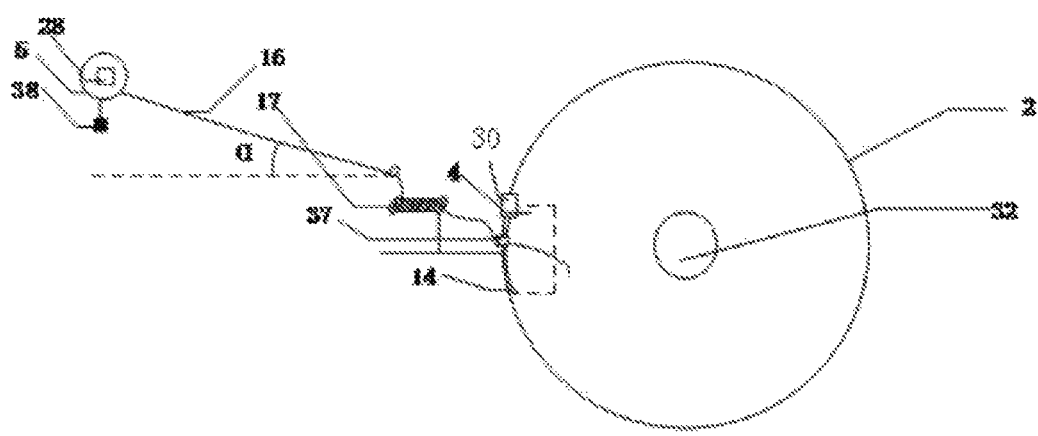
FIG. 3 is a flow diagram of the floating ball under the driving of the flow velocity of the invention.

Reference Signs: 1, cement pile; 2, glass cover; 2-1, pile hole; 3, casing pipe; 4, turbidity current sediment sampling device; 5, floating ball; 6, FBG differential pore-pressure sensor; 7, inner water-permeable stone; 8, sealing ring; 9, infrared excitation light source; 10, scattered light receiving system; 11, analog circuit module; 12, photoelectric sensor; 13, strain bulge membrane; 14, sampler opening; 15, turbidity current monitoring area; 16, Kevlar cable; 17, Kevlar cable reel; 18, water-permeable stone ring; 19, transmission fiber; 20, optical fiber watertight connector; 21, FBG demodulator; 22, slide rail; 23, mounting base; 24, laser emission light source; 25, light-emitting tube base; 26, light filter; 27, light receiving plate; 28, three-axis acceleration sensor; 29, acquisition system circuit board; 30, sampler switch; 31, water inlet passage; 32, top water-permeable stone; 33, FLASH chip; 34, parallel laser; 35, underwater acoustic communication apparatus; 36, top water inlet passage; electric watertight connector; 38, counter weight.

DETAILED DESCRIPTION OF THE EMBODIMENTS

In the generation process of a turbidity current, the relation between the flow velocity and the turbidity of the turbidity current is unclear and cannot be accurately known; sampling of sediments generated by the turbidity current is significant to research on the generation of the turbidity current, stratum information during the passing of the turbidity current, as well as erosion and deposition situations; and excess pore water pressure of the sediments is a determining factor of the stability of the sediments and will inevitably be changed by the generation of the turbidity current.

The device can capture the flow velocity, turbidity, sediment pore pressure, and sediment sample of the turbidity current in situ when the turbidity current is generated and can observe the change of the excess pore water pressure in situ under the influence of the turbidity current, so as to further analyze the destruction mechanism of the turbidity current on a stratum. This is significant to the research on protecting submarine optical fibers against the destruction from the turbidity current.

The turbidity current monitoring device primarily includes cement pile pore-pressure monitoring, optical turbidity monitoring, floating ball flow velocity monitoring, and turbidity current sediment sampling. The whole device is formed by the combination of a cement pile and a high-strength glass cover. The cement pile and a casing pipe cooperatively form a combined-type excess pore-pressure monitoring probe rod, the glass cover is in threaded connection with the pore-pressure monitoring probe rod, an infrared excitation light source and a scattered light receiving system are mounted in the glass cover, a turbidity current sediment sampling device is mounted on a body of the glass cover, and a turbidity current flow-velocity monitoring floating ball is mounted outside the glass cover.

The invention is further detailed as follows in combination with the drawings and specific implementations.

As shown in FIG. 1, the device for multi-parameter integrated monitoring of a deep submarine turbidity current structurally includes an upper part and a lower part, wherein:

The lower part includes a cement pile 1 which has a length of 5 m and a diameter of 50 cm, and 316L stainless steel casing pipe 3 having a length of 5 m and a diameter of 15 cm is embedded into the cement pile 1 to form a combined-type pore-pressure monitoring probe rod; and the casing pipe includes five sections, each section is 1 m long, and sealing rings 8 are located at joints of the casing pipe. Water-permeable stones 7 are mounted on a rod body, and water-permeable stone rings 18 are clamped in the cement pile 1 at an interval of 1 m in a vertical direction and have an outer diameter identical to the outer diameter of the cement pile 1 and an inner diameter identical to the outer diameter of the steel casing pipe. In this embodiment, the water-permeable stone rings 18 have an outer diameter of 50 cm, an inner diameter of 15 cm, and a height of 15 cm, so that it is ensured that only pore water acts on a sensor-based pressure sensing area, while sediments cannot enter this area.

FBG differential pore-pressure sensors 6 are arranged in the probe rod, the bottoms of the sensors are connected with the water-permeable stones 7 through water let passages 31, the water-permeable stones 7 transfer the seabed pore water pressure, the tops of the sensors 6 are connected with a top water-permeable stone 32 through a top water inlet passage 36, seawater from above enters the probe rod through the top water-permeable stone 32 to act on the static pressure of seawater, the pressure of the seawater from above and the pore pressure of seabed sediments act on strain bulge membranes 13 in the FBG differential pore-pressure sensors 6, the strain bulge membranes 13 sense the difference (namely the excess pore water pressure) between the pressure of the seawater from above and the pore pressure of the seabed sediments, and an acquired excess pore pressure signal passes through a transmission fiber 19 to be transferred, via an optical fiber watertight connector 20, to a FBG demodulator 21 in the glass cover and is then demodulated and acquired to obtain the excess pore pressure to be stored in a FLASH chip (33).

Figure 4:
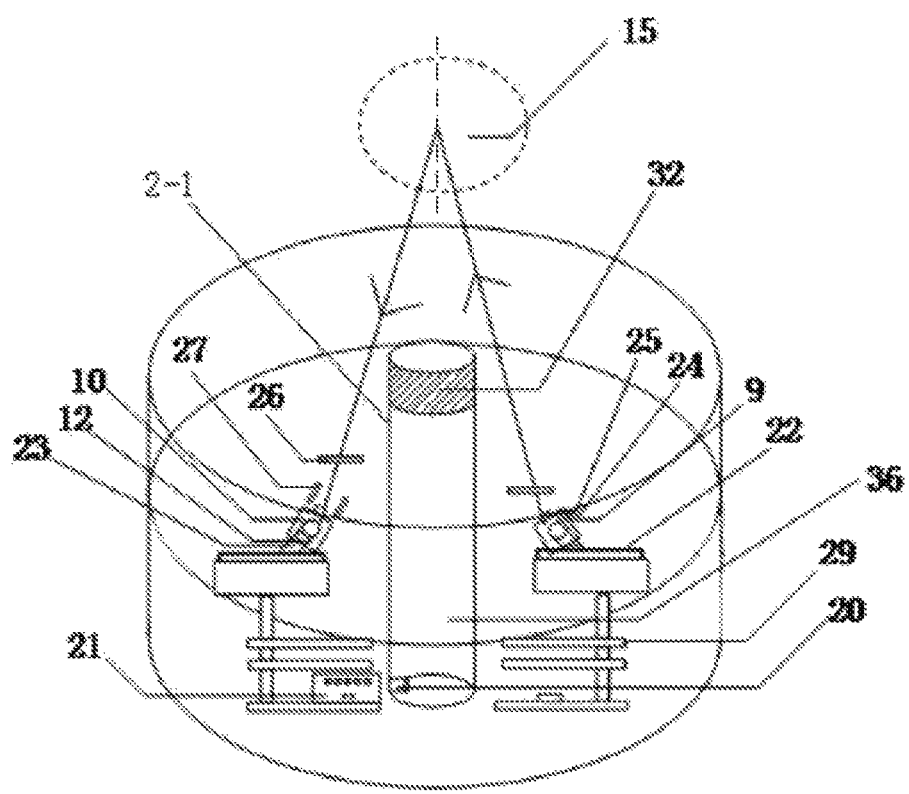
FIG. 4 is a structural view of turbidity observation of a turbidity current of the invention.

Refer to FIG. 1 and FIG. 4, the high-strength light-transmitting glass cover 2 is located at the upper part and has an outer diameter of 150 cm, and the top water-permeable stone 32 is mounted at the top. A control circuit board and a slide rail 22 are mounted in the glass cover, a scattered light receiving system and an infrared excitation light source capable of emitting an incident light are mounted on the slide rail 22 through mounting bases 23, an infrared laser emission light source and the scattered light receiving system can be rotated and adjusted on the mounting bases to change the direction, and such rotation and adjustment structure is a conventional structure and will not be detailed anymore herein. The relative distance between the two mounting bases 23 on the slide rail 22 can be adjusted to adjust the emitting angle and the receiving angle of the light source, namely the range of a turbidity monitoring area. The mounting bases 23 can be driven by driving equipment, such as a servo motor, to move on the slide rail 22. The excitation light source includes an LED infrared light source 24 and a light-emitting tube base 25, and the scattered light receiving system includes a photoelectric sensor 12, a light filter 26 and a light receiving plate 27 which are sequentially mounted. The turbidity monitoring area 15 is located at a 60-90° intersection of the incident light and a scattered light, parallel lasers 34 emitted by the infrared light source pass through the turbidity monitoring area 15, penetrate through the turbidity current, and change the transmitting direction when encountering particles, so as to be scattered, the scattered lasers enter an optical receiving system 10 at an angle of 60-90° relative to the incident light, and the suspension concentration of the monitoring area can be obtained based on the principle that the scattering degree of the lasers is in direct proportion to the quantity of suspension particles. A reflected light is controlled and selectively collected and transmitted by the light receiving plate 27 and the light filter 26 to reach the photoelectric sensor 12 so as to complete optical-electric signal conversion, and therefore, the turbidity of the turbidity current is measured.

Four turbidity current sediment samplers 4 are respectively arranged in four directions of the middle of the device, sampler switches 30 are connected with a Kevlar coaxial cable reel 17, a Kevlar coaxial cable 16 which is 30 m long is wound on the Kevlar coaxial cable reel 17 in advance, a counter weight 38 is hung below a floating ball 5 mounted at the end of the Kevlar coaxial cable 16, the floating ball 5 and the counter weight 38 are kept balanced in a vertical direction, a three-axis acceleration sensor 28 is arranged in the floating ball 5, and an acceleration signal can be transmitted to an acquisition system circuit board 29 through the Kevlar coaxial cable 16 so as to obtain an x, y, z three-dimensional acceleration of the flowing turbidity current, wherein the three-axis acceleration is an optimal parameter for describing the dynamics characteristics of turbidity current movement and is the change rate of turbidity current velocity. Meanwhile, the velocity is the change rate of the moving position of the floating ball driven by the turbidity current. Integration and derivation are two opposite processes, the three-axis acceleration of the floating ball driven by the turbidity current is obtained through the three-axis acceleration sensor arranged in the floating ball, and movement velocities and displacements of the floating ball in three directions can be obtained through single integration and double integration of the acceleration. When the flow velocity of seawater reaches preset values, such as 10 m/s, 20 m/s, 30 m/s, and 40 m/s under the action of a large turbidity current passing by, the force applied by the turbidity current to the floating ball reaches preset pulling stresses, the floating ball having different preset pulling stresses can drive a weight to flow, and at this moment, the control circuit board 29 receives feedback from the Kevlar coaxial cable 16 and starts to record an acceleration time curve of the movement of the floating ball 5 driven by the turbidity current; and when wholly straightened, the Kevlar coaxial cable 16 feeds back to the circuit board 29, and the circuit board 29 saves electric signal data, changing with time, of the acceleration and transmits and saves the data to a FLASH chip 33 in the glass cover through an electric watertight connector 37. When the floating ball 5 is driven by the seawater to flow, the circuit board 29 receives a signal and sends a command to open the sampler openings to the sampler switches 30, and then the sampler switches 30 are turned on; and when the Kevlar coaxial cable 16 is wholly extended and straightened, the circuit board 29 receives a signal and sends a command to close the sampler openings 14 to the sampler switches 30, and then the sampler openings 14 of are closed. A floating ball acceleration monitoring unit of the device can acquire dynamic data of the three-dimensional acceleration during generation of the turbidity current in real time, can acquire the acceleration during generation of the turbidity current, can determine the flow velocity according to an acceleration value obtained after the floating ball 5 is wholly and completely extended and then is straightened again, and can determine the direction of the flow velocity according to an included angle between the Kevlar cable 16 and a holder.

The device can observe the turbidity, excess pore pressure, flow velocity, and other parameters of the turbidity current, can fulfill simultaneous and real-time transmission for in-situ monitoring, and can complete multiple tasks at the same observing position, so that the situation where the sampling position and the observing position are different due to the movement of an apparatus along with a ship during ordinary work is avoided. When the turbidity current passes through an area in which the device is arranged, the infrared excitation light source in the glass cover emits infrared lasers, which in turn penetrate through the glass cover and the turbidity current monitoring area to be received by the scattered light receiving system and then pass through the photoelectric sensor to complete optical-electric signal conversion, so that the turbidity is measured. The turbidity current acts on the seabed sediments to cause the erosion and the deposition of a seabed as well as the change of the excess pore pressure of the seabed sediments. The pore pressure of the seabed acts on the lower sides of the differential-pressure sensors through the water-permeable stones, the pressure of overlying seawater acts on the upper sides of the sensors, and the pressures on the upper sides and the lower sides of the strain bulge membranes 13 of the two sensors are counteracted, so that the excess pore pressure is measured. Flow velocity measurement and corresponding sampling of the turbidity current at different flow velocities are achieved through the device during the generation of the turbidity current. When the flow velocity of the turbidity current is more than 10 m/s, 20 m/s, 30 m/s, and 40 m/s, the Kevlar cable 16 having different pulling stresses prestored is pulled by the floating ball 5 to be completely extended, a system program begins to acquire the change of the flow velocity at the moment the Kevlar cable is pulled. The actual flow velocities of the turbidity current at different flow velocity sections are obtained through time computation by a circuit in this process; when pulled, the Kevlar cable triggers the sampler switches 30 to drive the sampler openings 14 of the sediment samplers to open, so that turbidity current sediment sampling is completed; and then the sampler openings 14 of the sediment samplers are automatically closed through the induction of the sampler switches 30. The device can ensure accurate sampling by turning on the sampler switches 30 when the turbidity current passes, and can ensure that samples of suspended sediments generated during the generation of the turbidity current are acquired. This is crucial to the research of the generation mechanism of the turbidity current.

After the system completes multiple samplings of the turbidity current, a research vessel is driven to a research area a certain time later, a shipboard underwater acoustic communication apparatus sends a signal to inquire the sampling condition of the system, and a judgment can be made next according to a feedback signal from the underwater acoustic communication apparatus. If it is fed back by acoustic communication that the sampling system has collected turbidity current samples, whether or not an underwater acoustic signal needs to be sent to recover the glass cover 2 at the upper part and to enable the combined-type pore-pressure monitoring probe rod at the lower part to stay at the original position is determined. Later, a new glass cover 2 can be accurately arranged through an ROV so as to continue to monitor the turbidity current.

The above embodiments are only preferred ones of the invention, and are not intended to limit the invention in other ways. Alterations or transformations made by those skilled in this field based on the technical contents disclosed above should be regarded as equivalent embodiments to be applied to other fields, and all simple modifications, equivalent changes, and transformations which are made on the above embodiments on the basis of the technical essence of the invention without deviating the contents of the technical solution of the invention still fall within the protection scope of the technical solution of the invention.

What is claimed is:

1. A device for multi-parameter integrated monitoring of a deep submarine turbidity current, comprising:
    an upper part and a lower part;
    wherein,
        the lower part comprises a cement pile, and a casing pipe embedded into the cement pile to form a combined-type pore-pressure monitoring probe rod;
            a plurality of water-permeable stone rings are clamped in the cement pile in a spaced manner in a vertical direction and have an outer diameter identical to an outer diameter of the cement pile and an inner diameter identical to an outer diameter of the casing pipe;
        a plurality of inner water-permeable stones and a plurality of FBG pore-pressure sensors are arranged on an inner wall of the casing pipe and are located on the water-permeable stone rings, wherein the plurality of inner water-permeable stones and the plurality of FBG pore-pressure t of the lower part, the plurality of FBG pore-pressure sensors have bottoms connected with the plurality of inner water-permeable stones and upper parts connected with a top water-permeable stone, seawater from above enters the probe rod through the top water-permeable stone, and a pressure of the seawater and a pore pressure of seabed sediments act on the plurality of FBG pore-pressure sensors;
        the upper part comprises a glass cover, and a pile hole is formed in the glass cover and has a bottom in threaded connection with the casing pipe and a top provided with the top water-permeable stone; and
        a control circuit board and a slide rail are mounted in the glass cover, a scattered light receiving system and an infrared excitation light source configured for emitting an incident light are mounted on the slide rail through mounting bases, an emitting angle and a receiving angle of the light source are adjustable through adjustment of rotation directions of the mounting bases and a relative distance between two mounting bases on the slide rail, and an intersection of the incident light and a scattered light is a turbidity monitoring area; and
        a plurality of turbidity current sediment samplers are distributed around the glass cover, wherein the plurality of turbidity current sediment samplers are a part of the upper part, sampler switches are connected with a Kevlar cable reel, and a three-axis acceleration sensor is arranged in a floating ball mounted at an end of a Kevlar cable.

2. The device for multi-parameter integrated monitoring of a deep submarine turbidity current according to claim 1, wherein the plurality of water-permeable stone rings are clamped in the cement pile at an interval of 1 m.

3. The device for multi-parameter integrated monitoring of a deep submarine turbidity current according to claim 1, wherein the cement pile has a length of 5 m and an outer diameter of 50 cm, and the casing pipe has a length of 5 m and a diameter of 15 cm and is made of a 316L stainless steel.

4. The device for multi-parameter integrated monitoring of a deep submarine turbidity current according to claim 3, wherein the scattered light receiving system comprises a photoelectric sensor, a light receiving plate, and a light filter; the photoelectric sensor, the light receiving plate and the light filter are sequentially mounted.

5. The device for multi-parameter integrated monitoring of a deep submarine turbidity current according to claim 4, wherein the Kevlar cable has a length of 30 m.

6. The device for multi-parameter integrated monitoring of a deep submarine turbidity current according to claim 2, wherein the cement pile has a length of 5 m and an outer diameter of 50 cm, and the casing pipe has a length of 5 m and a diameter of 15 cm and is made of a 316L stainless steel.

7. The device for multi-parameter integrated monitoring of a deep submarine turbidity current according to claim 6, wherein the scattered light receiving system comprises a photoelectric sensor, a light receiving plate, and a light filter; the photoelectric sensor, the light receiving plate and the light filter are sequentially mounted.

8. The device for multi-parameter integrated monitoring of a deep submarine turbidity current according to claim 7, wherein the Kevlar cable has a length of 30 m.

* * * * *